June 16, 1931.  J. H. RITTER  1,810,730
GLASS FURNACE CHARGING APPARATUS
Filed Aug. 23, 1929  2 Sheets-Sheet 2
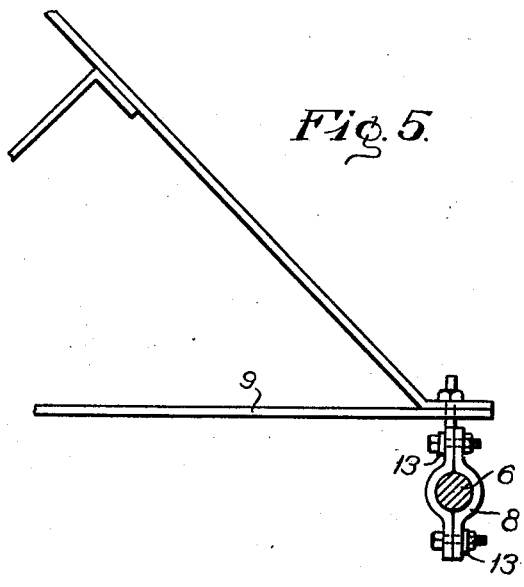
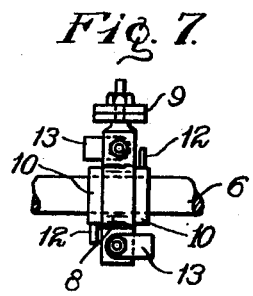
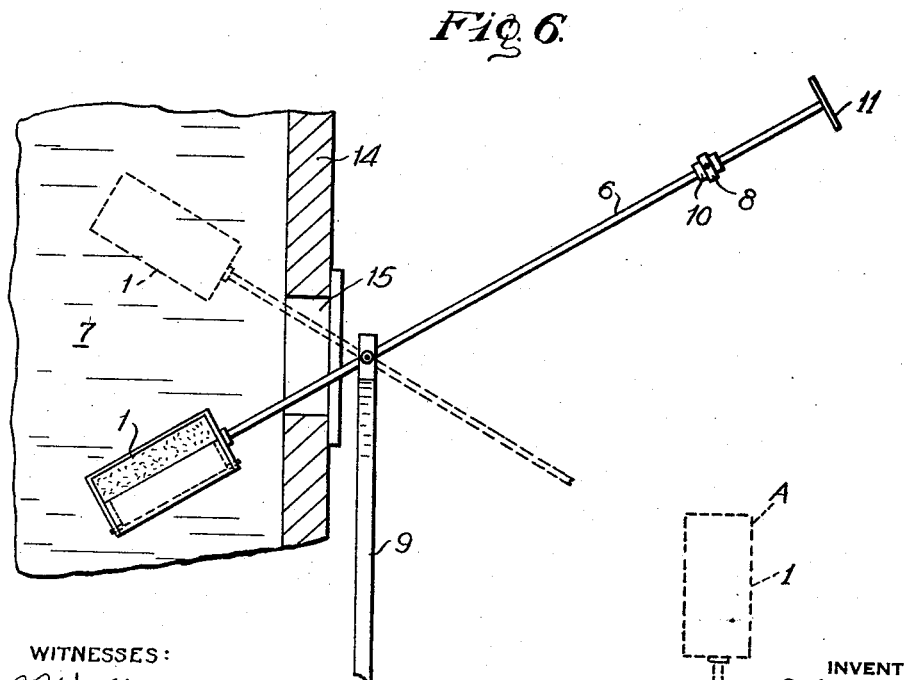

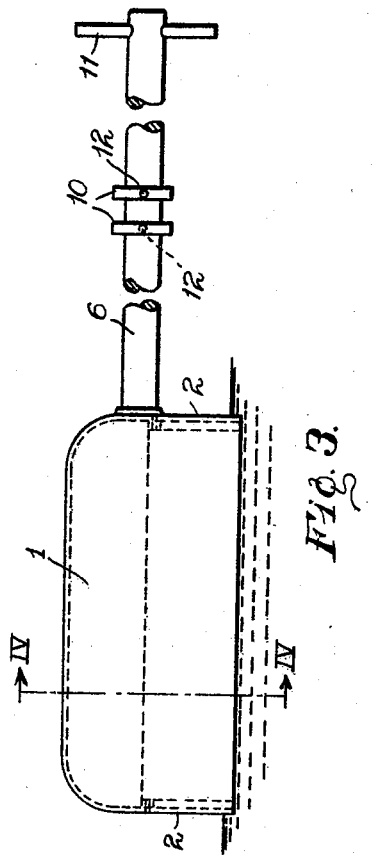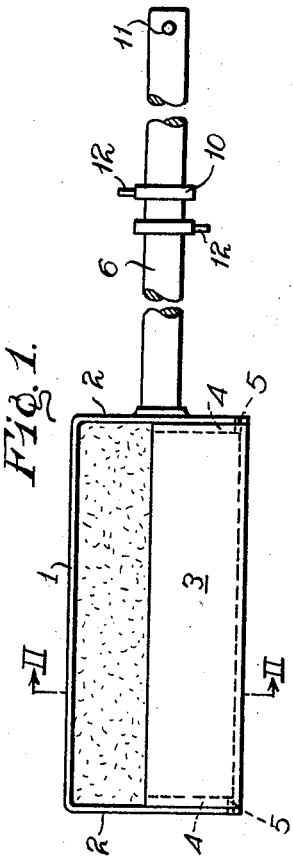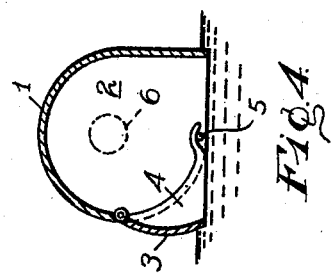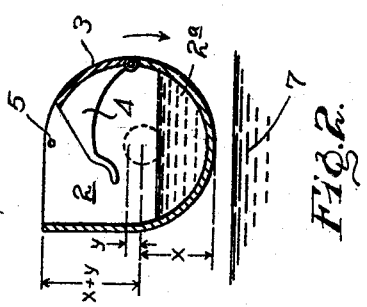

Patented June 16, 1931

1,810,730

UNITED STATES PATENT OFFICE

JOHN H. RITTER, OF CHARLEROI, PENNSYLVANIA

GLASS FURNACE CHARGING APPARATUS

Application filed August 23, 1929. Serial No. 387,916.

This invention relates to apparatus for charging glass furnaces.

In the manufacture of glass the customary practice is to periodically add charges of batch to the molten glass in the furnace, to replenish that used. Undercharging is not practicable with all types of glass melting, and surface charging by means of a ladle or similar charge-carrying device has been usually practised. This procedure causes the production of considerable amounts of dust which may in various ways interfere with satisfactory production. For example, dust from a batch intended to produce colored glass may spread to another glass, either colored or colorless, and deleteriously affect its color.

An object of this invention is to provide glass-furnace charging apparatus which is adapted to prevent the spreading of dust in the furnace by cooperating with the surface of the molten glass to form a sealed chamber enclosing the discharged batch, and which is simple, sturdy and easily operated, and is adapted for use generally with glass melting furnaces.

Another object is to provide apparatus of the type referred to which discharges its contents by inversion over the molten glass, and which is so formed that when inverted its sides enter the glass to seal the ladle chamber, without disturbing the surface of the glass.

The preferred embodiment of the invention is shown in the accompanying drawings, in which Fig. 1 is a plan view of a ladle embodying the invention, the ladle being in an upright position; Fig. 2 a cross section taken on line II—II, Fig. 1; Fig. 3 a side view of the ladle in inverted position; Fig. 4 a cross section taken on line IV—IV of Fig. 2; Fig. 5 an elevation of one form of supporting means for use with the ladle; Fig. 6 a plan view, partly in section, showing the mode of use of the ladle; and Fig. 7 a fragmentary side view of a portion of the support shown in Fig. 5.

In accordance with this invention, charges of batch are introduced into a furnace by means of a charge-carrying ladle, or the like, having portions adapted, when the batch is discharged, to meet or dip under the surface of the molten glass and thereby to seal the ladle chamber and retain all of the dust formed when the charge is dumped.

In the preferred embodiment, a trough-like ladle is used, of the type which is inverted to discharge its contents, and most suitably one side is shorter than the other, so as to clear the surface of the glass in inverting the ladle, this side being provided with a movable extension member which is effective, upon full inversion of the ladle, to seal the side. In this embodiment it is also preferred to dispose the axis of rotation in such manner that, when the ladle is introduced into the furnace with its bottom at or above the surface of the glass, rotation will produce the action just described.

The invention may be understood most readily from the accompanying drawings, in which the preferred embodiment is shown as a charge-carrying ladle having continuous side and bottom walls 1 forming with end walls 2 an elongate open-top trough of J-shape. That is, one side wall is shorter than the other. As shown in Fig. 2, the bottom wall is preferably curved, and the tops of the end walls are curved between the tops of the side walls. The short side wall is provided with a shutter or flap member 3 pivotally connected to its upper edge and curved as shown in Figs. 2 and 4, which extends the full length of the trough, and which is provided at its ends with end members 4. When the ladle is in an upright position, this shutter member preferably is positioned as shown in Fig. 2, and when the ladle is inverted, the shutter swings downwardly to form an extension of this side wall. The shutter thus acts to retain a charge $2^a$ in the ladle while it is being inverted, and when inverted, the movement of the shutter brings it into cooperation with the surface of the glass, as seen in Fig. 4. The shutter is restrained from swinging too far when the ladle is inverted, by engagement of the end members 4 with stops 5, the stops being preferably arranged so as not to come into contact with the molten glass.

The ladle is also provided with means for supporting and inverting it, such as a shaft 6 connected to one of its ends, and in the preferred embodiment the axis of rotation is placed below the center of the ladle and when the ladle is in an upright position. That is, the distance from the bottom of the ladle to the axis of rotation is less than that from said axis to the top of the ladle. This type of construction permits the introduction of the ladle into the furnace with its bottom at a small distance above the surface of the glass, and, when the shaft is rotated to invert the ladle, the sides meet or dip under the surface to effect the aforementioned sealing, which action is shown in Figs. 2 and 4. As seen in Fig. 2, the ladle is supported just above the surface of molten glass 7, and the distance $x$ from the bottom of the ladle to its axis of rotation is less than that between the axis of rotation and the top of the ladle by an amount $y$. Due to these relations, the sides will enter the glass to a distance equal to $y$ when the ladle is inverted, as shown in Fig. 4.

In order to introduce the ladle into a furnace any suitable supporting means may be used. It is preferred to use a swinging crane, so that the apparatus may be moved away from the charging door when not in use. One such construction is shown in Figs. 5 to 7, in which the shaft 6 is carried in an eye 8 swiveled in a crane 9 of any suitable construction, the shaft being provided with spaced collars 10, Fig. 7, to prevent longitudinal movement of the shaft through the eye.

The ladle may be inverted by application of rotating force to a handle 11 provided on shaft 6, stops being preferably provided to check rotation when the ladle is inverted. The ladle should be inverted quickly, and in order to absorb the impact due to sudden stopping of the ladle with its heavy load, there may be provided shock-absorbing means. In the form shown, stops which themselves act to absorb the impact shock are used. This is accomplished by means of diametrically opposed studs 12 provided on collars 10, which meet leaf spring members 13 connected to opposite sides of eye 8 for contact with the studs when the shaft is rotated to inverted position.

As shown in Fig. 6, the crane is mounted with relation to a glass furnace 14 so that the ladle may be swung back from the furnace to the dotted line position A for receiving charges at a point distant from charging door 15. When a charge is to be put in the furnace, the crane is moved to the position shown in solid lines, by pushing on the handle of the shaft, the ladle being guided through the door, and, after being introduced into the furnace, the ladle is moved to one side or the other, as shown, for dumping. The ladle is, of course, hung at such a height, or is so manipulated, that its bottom is at, or preferably adjacent to, the surface of the molten glass in the furnace, the distance above the glass being, of course, less than the amount the axis of rotation is below the center of the ladle.

When the ladle is properly positioned, rotating force is applied to the shaft, the direction of rotation being such that the short side moves over the surface of the glass, the long side being brought into the glass just as the ladle reaches its inverted position. That is, with reference to Figs. 1 and 2, the ladle is turned in a clockwise direction. As the ladle reaches its inverted position, the charge of batch falls to the surface of the glass, and flap 3, together with the long side, seals the ladle chamber from the furnace, so that dust which rises cannot spread into the furnace. The ladle is allowed to remain inverted for a few moments, to permit the dust to settle and the charge to sink into the glass, when it is again brought to its upright position by rotating the shaft, for example in a counter-clockwise position.

Apparatus embodying the invention thus eliminates the deleterious dusting which has previously accompanied intermittent charging. The apparatus is simple and does not require any substantial amount of skill in its operation. Various means may be used to prevent the glass from adhering to the ladle, as for example applying a thin film of oil to the surfaces which contact with the glass, before the ladle is inserted in the furnace.

According to the provisions of the patent statutes, I have explained the construction and operation of my invention and have illustrated and described what I now consider to be its best embodiment. However, I desire to have it understood that, within the scope of the appended claims, the invention may be practiced otherwise than as specifically illustrated and described.

I claim:

1. A glass-furnace charging apparatus adapted to prevent dusting, comprising a rotatably mounted open-top charge-carrying ladle having sides of unequal length and adapted to discharge its contents by inversion of the ladle, and a movable member connected to the shorter of said sides to form an extension thereof when the ladle is inverted, the sides of the ladle when inverted cooperating with the surface of the molten glass to seal the charge from the furnace and thereby prevent spreading of dust in the furnace.

2. A glass-furnace charging apparatus adapted to prevent dusting, comprising a charge-carrying ladle having side walls of unequal length and a bottom wall, a shutter pivotally connected to the edge of the shorter of said side walls, and means for rotating the ladle to invert it and discharge its contents onto the surface of the molten glass in the furnace, said shutter being effective to retain the charge in the ladle until inverted and when inverted forming an extension of the shorter side wall which with the longer wall cooperates with the surface of the molten glass to seal the charge from the furnace and thereby prevent spreading of dust in the furnace.

3. A glass-furnace charging apparatus adapted to prevent dusting, comprising a charge-carrying ladle having side walls of unequal length and a curved bottom wall continuous therewith forming an open-top charge-receiving chamber, a shutter pivotally connected to the edge of the shorter of said side walls to retain the charge until the ladle is inverted, and a horizontally disposed shaft connected to an end of the ladle for supporting and rotatably inverting it, said shutter when the ladle is inverted swinging downwardly to form an extension of said shorter side wall and with the longer side wall dipping into the surface of the molten glass to prevent spreading of dust in the furnace.

4. A glass-furnace charging apparatus adapted to prevent dusting, comprising a charge-carrying ladle having side walls of unequal length and a bottom wall forming an open-top charge-receiving chamber, a shaft connected to an end wall of the ladle for supporting it and for rotating the ladle to discharge its contents, the distance from the bottom of the ladle to the axis of rotation being less than that from said axis to the top of the ladle whereby the longer of said side walls cooperates with the surface of the molten glass to seal the ladle chamber when the ladle is inverted from an upright position with its bottom adjacent the glass surface, and a movable member connected to the shorter of said side walls and effective upon inversion of the ladle to complete the seal and prevent spreading of dust in the furnace.

5. A glass-furnace charging apparatus adapted to prevent dusting, comprising a charge-carrying ladle adapted to discharge its contents by inversion, and ladle-supporting and rotating means associated with an end of the ladle, the axis of rotation of the ladle being below the center of said end, whereby when the ladle is inverted from an upright position with its bottom adjacent the surface of the glass in the furnace the sides will cooperate with the surface of the glass to seal the ladle chamber and prevent spreading of dust in the furnace.

6. A glass-furnace charging apparatus adapted to prevent dusting, comprising a charge-carrying ladle having long and short side walls and a bottom forming an open-top charge-receiving chamber of J-like cross section, a shutter pivotally connected to the upper edge of said short side wall, and a shaft for supporting and rotating the ladle connected to an end thereof below the center of said end, said shutter being effective to retain the charge in the ladle until it is inverted and when inverted swinging downwardly and with said longer side wall cooperating with the surface of the molten glass to prevent spreading of dust in the furnace.

In testimony whereof, I hereunto sign my name.

JOHN H. RITTER.